(12) United States Patent
Bagwell et al.

(10) Patent No.: US 7,912,568 B2
(45) Date of Patent: Mar. 22, 2011

(54) TUNING ORDER CONFIGURATOR PERFORMANCE BY DYNAMIC INTEGRATION OF MANUFACTURING AND FIELD FEEDBACK

(75) Inventors: Derek P. Bagwell, Rochester, MN (US); Joni L. Buttke, Norwalk, CT (US); Gary V. Tollers, Rochester, MN (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 11/945,700

(22) Filed: Nov. 27, 2007

(65) Prior Publication Data

US 2009/0138117 A1    May 28, 2009

(51) Int. Cl.
G06F 19/00 (2006.01)
G06F 11/30 (2006.01)
G06F 17/30 (2006.01)
G21C 17/00 (2006.01)
G07G 1/00 (2006.01)
G06Q 10/00 (2006.01)

(52) U.S. Cl. .......... 700/103; 700/99; 700/105; 700/106; 700/110; 702/185; 705/10; 705/28

(58) Field of Classification Search .............. 700/95, 700/97, 99, 103–106, 108–110; 702/182–185; 705/7, 10, 28; 706/46–48
See application file for complete search history.

(56) References Cited

U.S. PATENT DOCUMENTS

| | | | |
|---|---|---|---|
| 5,086,397 A * | 2/1992 | Schuster et al. .............. 700/110 |
| 5,278,751 A * | 1/1994 | Adiano et al. .................. 705/10 |
| 5,315,509 A * | 5/1994 | Natarajan ....................... 705/28 |
| 6,175,934 B1 | 1/2001 | Hershey et al. |
| 6,263,322 B1 * | 7/2001 | Kirkevold et al. ............. 705/400 |
| 6,647,304 B2 * | 11/2003 | Tsukishima et al. ........... 700/95 |
| 6,690,016 B1 * | 2/2004 | Watkins et al. ............. 250/341.7 |
| 6,809,292 B2 | 10/2004 | Spear et al. |
| 6,922,656 B2 * | 7/2005 | Butler et al. .................. 702/183 |
| 6,965,806 B2 | 11/2005 | Eryurek et al. |
| 7,010,544 B2 * | 3/2006 | Wallen et al. ................. 707/791 |
| 7,032,816 B2 * | 4/2006 | Markham et al. ............. 235/376 |
| 7,257,552 B1 * | 8/2007 | Franco ........................... 705/28 |
| 7,302,445 B2 * | 11/2007 | Hurtis et al. .................. 707/102 |
| 7,324,860 B2 * | 1/2008 | Dyer ............................... 700/97 |
| 7,440,932 B2 * | 10/2008 | Gartland et al. ................ 706/46 |
| 7,546,225 B2 * | 6/2009 | Nguyen et al. .................... 703/2 |
| 2003/0033179 A1 * | 2/2003 | Katz et al. ......................... 705/7 |

(Continued)

OTHER PUBLICATIONS

Precup, Radu-Emil, et al; Development Method for Low Cost Fuzzy Controlled Servosystems; 2006 IEEE, Int'l Symposium on Intelligent Control, Oct. 4-6, 2006, pp. 2707-2712.

(Continued)

*Primary Examiner* — Crystal J Barnes-Bullock
(74) *Attorney, Agent, or Firm* — Steven M. Greenberg, Esq.; Carey Rodriguez Greenberg Paul, LLP

(57) ABSTRACT

A novel and non-obvious method, system and apparatus for tuning order configurator performance by dynamic integration of manufacturing and field feedback information. A method for dynamically tuning order configurator behavior by using product issue data can include collecting product issue data for a manufactured product, the product issue data including performance and attribute information of a part of the manufactured product, analyzing the collected product issue data to identify a problematic part, and, modifying the order configurator using the analyzed product issue data.

12 Claims, 5 Drawing Sheets

U.S. PATENT DOCUMENTS

| | | | |
|---|---|---|---|
| 2003/0099590 A1* | 5/2003 | Miura et al. | 423/412 |
| 2003/0171897 A1* | 9/2003 | Bieda et al. | 702/185 |
| 2004/0267395 A1* | 12/2004 | Discenzo et al. | 700/99 |
| 2005/0038541 A1* | 2/2005 | Clark et al. | 700/105 |
| 2005/0049883 A1* | 3/2005 | Boroson et al. | 705/1 |
| 2005/0137735 A1* | 6/2005 | Loy et al. | 700/109 |
| 2006/0265261 A1 | 11/2006 | Wetzer et al. | |
| 2007/0050070 A1* | 3/2007 | Strain et al. | 700/99 |
| 2007/0299748 A1* | 12/2007 | Shorter et al. | 705/28 |

OTHER PUBLICATIONS

Wong, H.; A Time Varying Output Feedback Controller for Nonlinear Systems with Linear Output Structure; 2004 IEEE Int'l Symposium on Intelligent Control, Sep. 2-4, 2004, pp. 340-345.

* cited by examiner

| Parts Selection Rule Modifier Example Table |
|---|
| Rules to Modify Part Configuration Rules |

| |
|---|
| If a part is failing only in one or two products, remove these products from the "Applicable Products" list property. |
| If this part is failing in all products but only with some other products, modify the "Can Not Work with" attribute of this apparently invalid combination of parts. Also, modify the pre-requisites or co-requisites if these appear in those lists. |
| If the part is always failing in most products, remove the part from available list. |
| If the part is occasionally failing in some products, reduce its "priority" in selections. |
| If the part is failing in certain environment, add rules/modify rules to check the environment and enable/disable this part. |
| If the failing part is auto-derived, change the auto-expansion rule to bring in an equivalent but different part (again by changing the attribute values). |
| If the failing part is auto-derived, change the auto-expansion rule to bring in an equivalent but different part (again by changing the attribute values). |
| If there are equivalent parts available and the configurations with those equivalent parts are more stable, increase the priority of the equivalent parts |

FIG. 6

TUNING ORDER CONFIGURATOR PERFORMANCE BY DYNAMIC INTEGRATION OF MANUFACTURING AND FIELD FEEDBACK

BACKGROUND OF THE INVENTION

1. Statement of the Technical Field

The present invention relates to integrated supply chain systems and more particularly to tuning order configurator performance by dynamic integration of manufacturing and field feedback information.

2. Description of the Related Art

Generally, in integrated supply chain manufacturing systems, customers place product orders via a user interface, e.g., via a computer in communication with the Internet. The generation of valid orders is the main objective of an "order configurator" (also called a sales configurator.) Typical order configurators use a set of product offering rules that specify and validate the various factors of part/component combinations such as compatibility, min-max values, pre-requirements, co-requisites, component capacity, and the like. Product engineers and marketing personal typically will prescribe the relationships between different parts and the rules that govern the selections of these parts. The rules are updated to reflect upcoming product announcements, production needs, and corrections. However, during the delay before the issuance of the updated rules, the order configurator can generate orders containing parts that are failing in manufacturing or the field.

Failing parts in manufacturing are encountered, typically, during the testing phase of the product. Failing parts in the field are typically encountered when the product is shipped and installed at the customer site and the field. Reliability and availability issues including component fault and performance degradation are often reported through the service mechanisms after a system has been installed and activated. Unchecked these problems may cause deterioration in customer satisfaction, rework of installed systems, increased maintenance expenses, and loss of business.

Current systems are human-based, manual processes where manufacturing and field failure information are used to manually review the current configuration rules, e.g., from announcement letters and data templates, to determine which rules need to be changed or added. Often new rules are created and added instead of modifying existing configuration rules. Typically, order configurator product modelers will use modeling logic to implement any new rules. Issues with current systems include being manual, unreliable, inefficient, and rather slow. For example, it may take several months before the manufacturing and field failure information are used to modify the order configuration rules (if they are used at all).

Current methods do not offer dynamically integrated manufacturing and field feedback to effectively optimize or tune an order configurator based on reported manufacturing and field failure data. Accordingly, the current order configurators will continue to configure orders with non-reliable parts and/or part combinations. Additionally, with current methods, there is a lack of automatic modification of the existing configurator rules. However, adding new configuration rules to the order configurator can continuously increase the size of the order configuration bucket.

SUMMARY OF THE INVENTION

The present invention addresses the deficiencies of the art with respect to order configurators, and provides a novel and non-obvious method, system and apparatus for tuning order configurator performance by dynamic integration of manufacturing and field feedback information. In one embodiment of the invention, a method for dynamically tuning order configurator behavior by using product issue data can be provided. The method can include collecting product issue data for a manufactured product, the product issue data including performance and attribute information of a part of the manufactured product, analyzing the collected product issue data to identify a problematic part, and, modifying the order configurator using the analyzed product issue data so as to avoid configuring the problematic/defective parts.

In another preferred embodiment of the invention, a product issues data processing system can be provided. The system can include a product issues data store, a product issues analysis module coupled to the product issues data store, an automated product issues feedback engine coupled to the product issues analysis module, the product issues feedback engine comprising program code enabled to collect product issues data for a manufactured product, the product issues data associating characteristics of the manufactured product determined to have issues during manufacturing and field deployment, to modify an existing configuration order for the manufactured product to account for the characteristics in the collected product issues data.

In yet another embodiment, the automated product issues feedback engine further includes product issues analysis object information, a parts selection rule modifier coupled to the product issues analysis object information, and an optimized order configurator coupled to the parts selection rule modifier, the configurator comprising rules for parts selection and parts object information.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 6 is a table containing examples of generic rules used to modify order configuration rules.

DETAILED DESCRIPTION OF THE INVENTION

Embodiments of the present invention provide a method, system and computer program product for optimizing and tuning of an order configurator by dynamic integration of product issues, e.g., manufacturing and field issues, feedback. In an embodiment of the invention, product issues data associating characteristics of a manufactured product determined to have operation issues during manufacturing and/or in the field can be collected. The collected product issues can be analyzed. Based on the product issues, e.g., manufacturing and field issues, analysis, a part selection (configuration) for the manufactured product can be modified to account for the characteristics in the collected product issues data. For example, product issues data such as an error code specifying a root cause, such as a failed part, for a failure exhibited in a product can be applied to modify or tune an order configurator. Thereafter, the product issues data can be applied to an order selection to account for characteristics associated with the collected product issues data by modifying the configuration rules. In addition, the product issues data can be applied to an order selection to account for characteristics associated with the collected product issues data by modifying the relevant attributes of the parts so that the next time the configuration rules are performed, the non-reliable parts and part combinations are appropriately removed or "discouraged" from future selection.

Figure 1:
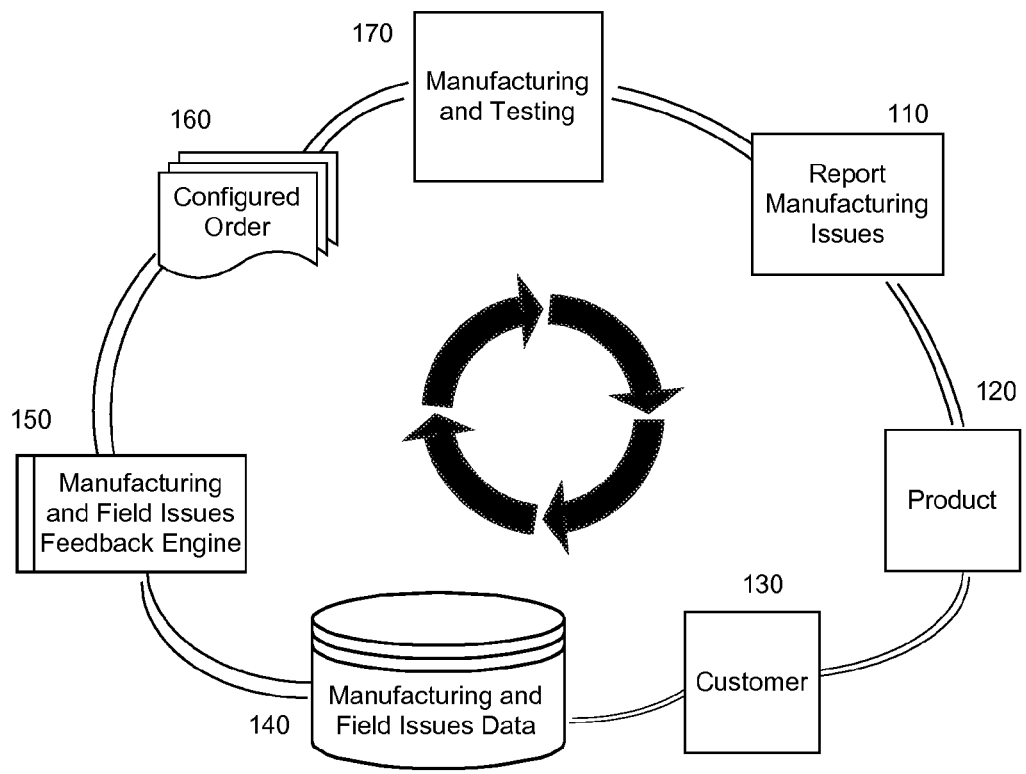
FIG. 1 is a pictorial illustration of a manufacturing supply chain network incorporating a dynamic manufacturing and field issues feedback engine.

In illustration, FIG. 1 is a pictorial illustration of a manufacturing supply chain network incorporating a dynamic manufacturing and field failure feedback engine. When a product 120 is manufactured, related manufacturing failure data regarding issues arising during manufacturing 110 of the product can be reported and stored in a manufacturing and field failure data store 140. Such manufacturing issues can be detected and defective parts will be replaced prior to shipping. The manufacturing failure data can be fed back to alter the behavior of the order configurator to not specify the defective part. Similarly, when a product 120 is shipped to a customer 130, related field issue data regarding issues arising in the field with the product also can be reported and stored in a manufacturing and field issues data store 140. During the order configuration development process, the manufacturing and field issues feedback engine 150 can analyze the type of issue or failure, determine characteristics of issue that reflect a root cause of the issue, dynamically modify the product configuration orders to remove, replace or adjust the non-reliable parts and/or product combinations to provide an optimized parts selection order configurator. The optimized configured product order 160 can be sent to the manufacturing facility for manufacturing and testing 170 and the feedback cycle from the manufacturing and field issues can be repeated again.

Figure 2:
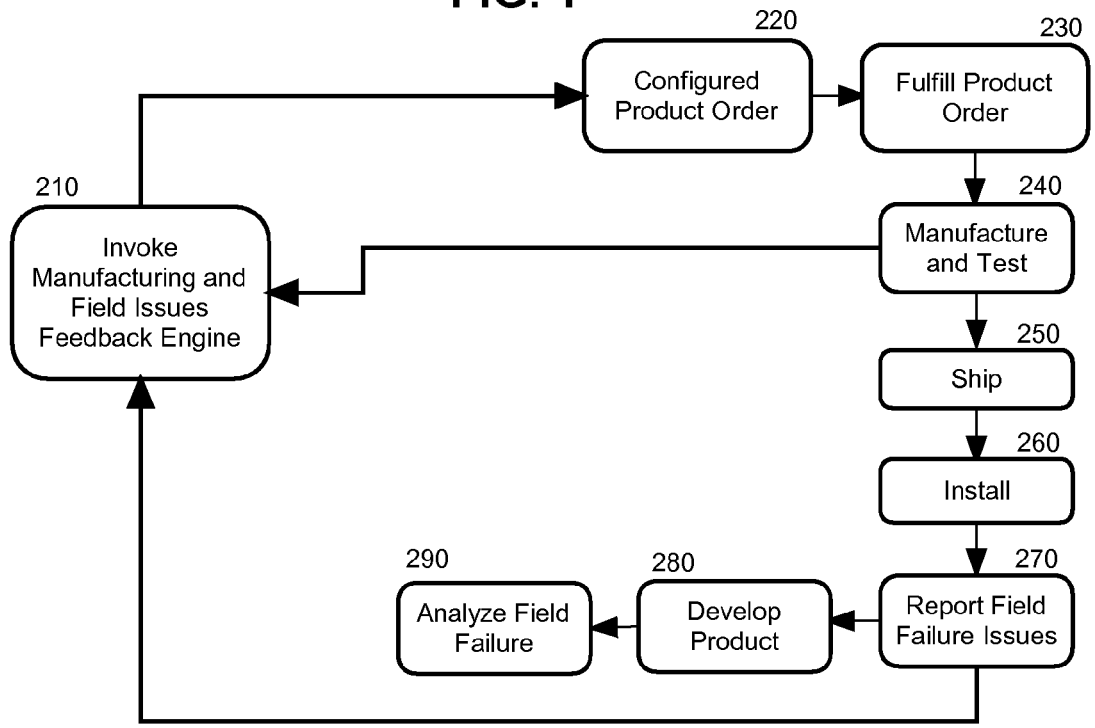
FIG. 2 is a flowchart illustrating a process for dynamic manufacturing and field issues feedback in a manufacturing supply chain process.

In further illustration of a manufacturing and field failure feedback engine, FIG. 2 is a flowchart illustrating a process for dynamic manufacturing and field issues feedback in a manufacturing supply chain process. A product can include a manufactured product component used in assembling a manufactured product. The manufacturing and field issues engine 210 can be invoked during the order configuration development process. The manufacturing and field issues feedback are used to update the rules that select the parts for a manufactured product.

The updates may occur offline. In block 220 the parts order can be configured along with fulfilling the product order 230. In block 240, the manufacturing product can be tested beforehand and the product manufactured and tested again afterwards. Any manufacturing issues arising during the manufacture and test of block 240 can be reported directly to the manufacturing and field issues engine 210 or can be stored in the manufacturing and field issues storage 140. In block 250 the manufactured and tested product can be shipped 250 to the customer. After installing the product in block 260, the field failure issues can be reported 270. In block 280 the product can be developed and the field issues can be analyzed in block 290. The feedback analysis can be used to update configurator rules that select parts as well as given to a product development group. Once the manufacturing and field issues are determined, they can be fed into the dynamic manufacturing and field issues feedback engine.

Figure 3:
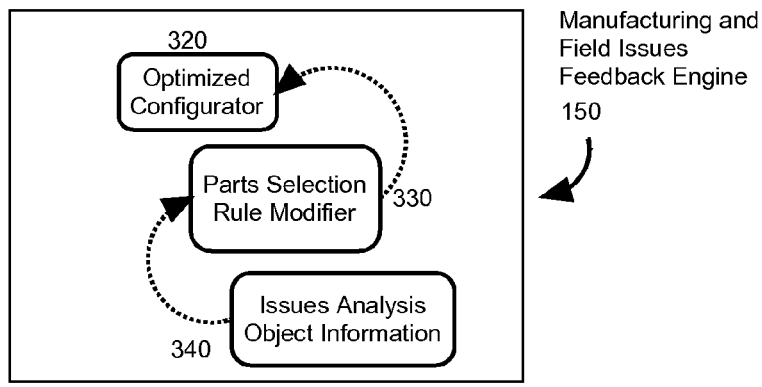
FIG. 3 is a schematic illustration of dynamic manufacturing and field issues feedback engine.

In yet further illustration, FIG. 3 is a schematic illustration of a dynamic manufacturing and field issues feedback engine 150. The dynamic manufacturing and field issues feedback engine 150 can include the optimized configurator 320, the parts selection rule modifier 330 and the manufacturing and field issues analysis object information 340. The dynamic manufacturing and field issues feedback engine 150 can have computer code enabled to analyze the product configuration orders and modify them with new attributes responsive to manufacturing and field issues feedback.

Figure 5:
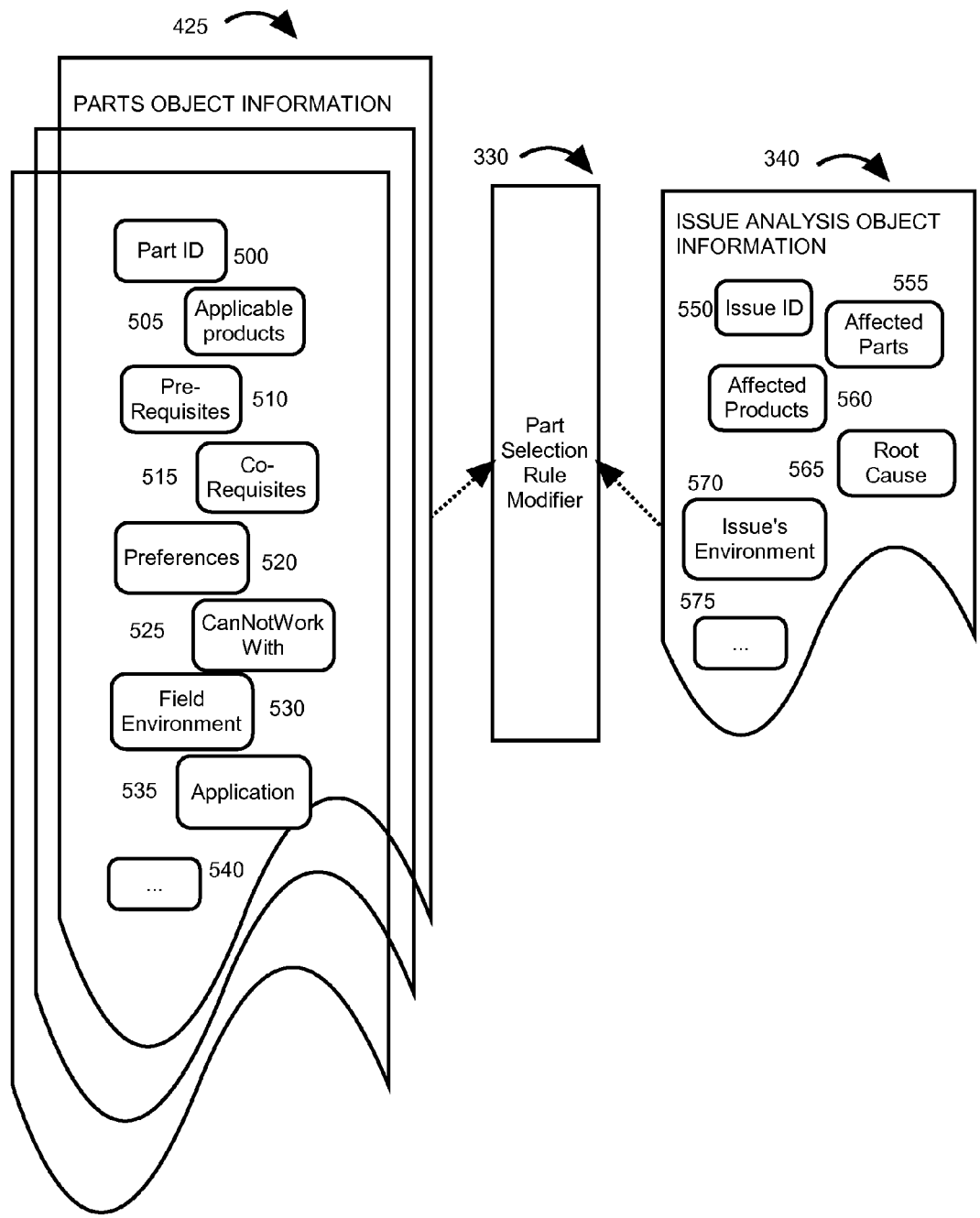
FIG. 5 is a block diagram illustrating attributes of the parts object information and manufacturing and field issues object information in FIG. 4.

The manufacturing and field issue analysis object information 340 can be a collection of observed or reported product issues as well as root cause analysis information represented in a form such as the form shown in FIG. 5. The parts selection rule modifier 330 can incorporate the manufacturing and field issue analysis object information 340 and can dynamically change the priorities of parts, the applicability status of parts, and selectively enable or disable certain parts configuration. Additionally, the parts selection rule modifier 330 can change the association between a particular part selected to a product order. The parts selection rule modifier 330 can have necessary logic to relate the issues analysis object information to part object information and associated parts selection rules. The optimized configurator 320 can incorporate the dynamic feedback received from the parts selection rule modifier 330 in order to fine-tune the rules that generate manufacturing parts selection.

Figure 4:
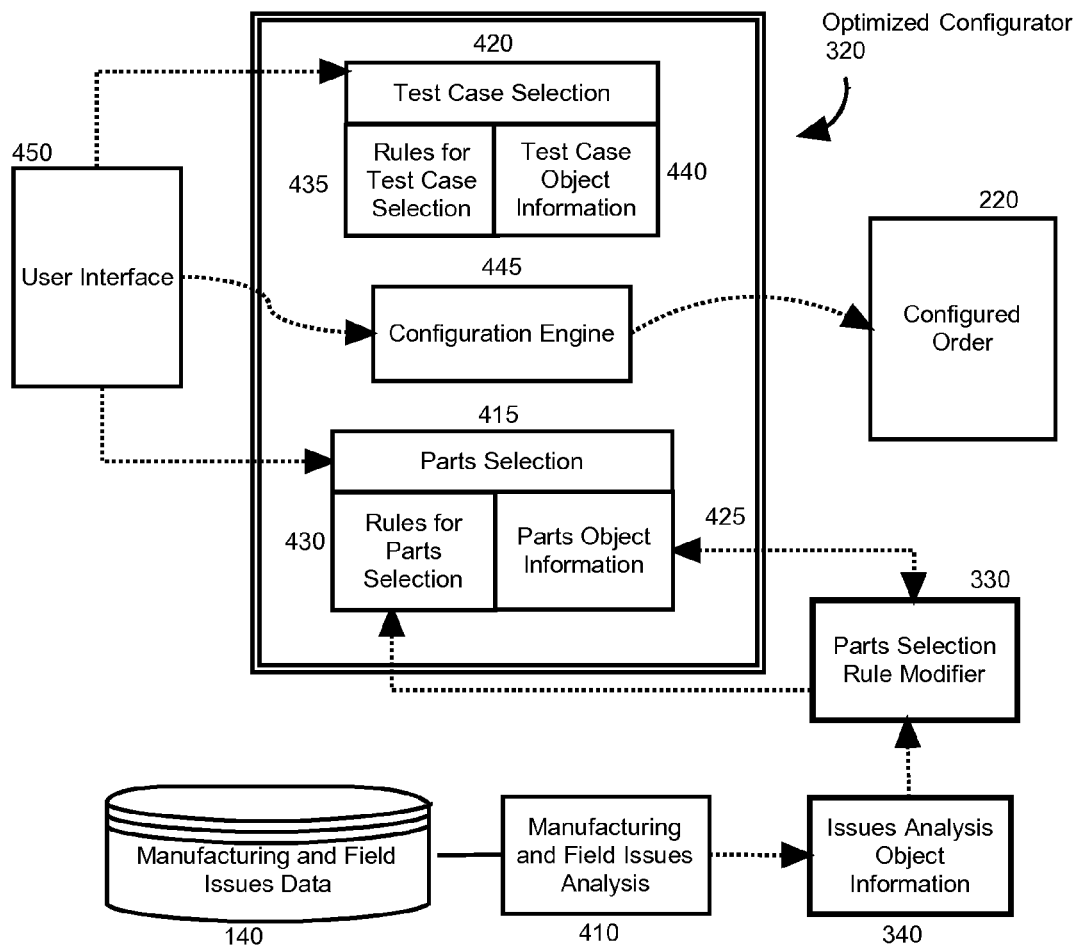
FIG. 4 is a schematic illustration of the dynamic manufacturing and field issues feedback engine incorporating an optimized order configurator of FIG. 3.

In further illustration, FIG. 4 is a schematic illustration of the dynamic manufacturing and field issues feedback engine incorporating an optimized order configurator of FIG. 3. Manufacturing and field issues analysis module 410 can be coupled to a manufacturing and field issues data store 140 that can include data associated with issues arising during the manufacturing process and arising from products installed and used in the field including a test case selection 420, rules for the test case selection 435 and test case object information 440. Issue analysis object information 340 can be coupled to the field manufacturing and field issue analysis module 410 and the parts selection rule modifier 330.

The optimized order configurator 320 can include an order configuration engine 445 and a parts selection module 415 containing rules for parts selection 430, and parts object information 425. The parts selection rule modifier 330 can have computer code enabled to update order configurations by incorporating the issue analysis object information 340 which can indicate non-reliable parts and/or part combinations and contain type of issue or failure, and root causes corresponding to a part or product. The parts selection rule modifier 330 is a "rule-based" logic. The generic rules of the parts selection rule modifier 330 can modify the relevant attributes of the parts used in the product configurations, so that when the optimized configurator 330 is applied in future configuration orders, the problematic parts are appropriately eliminated or discouraged from use in future part selections, i.e., product configurations. Some examples of the generic rules of the parts selection rule modifier 330 are illustrated and discussed with reference to the table of FIG. 6 below.

By way of a user interface 450, the optimized order configurator 320 can include a configuration engine 445 that can be enabled to take the updated parts object information 425 and rules modified by the parts selection rule modifier 330 and configure a product order by incorporating the rules for parts selection 430 and parts object information 425. Thus after collecting product issues data, e.g., manufacturing and field issue data, for a manufactured product, the parts selection rule modifier 330 can modify or tune the order configurator to account for the characteristics in the collected manufacturing and field issue data, and apply the order configurator to the next product order.

Consequently, the configured product order 220 can be accomplished by dynamically modifying the part object attributes or elements, and removing or eliminating those parts and/or part combinations that fail more often based on dynamic manufacturing and field issue feedback.

In further illustration, FIG. 5 is a block diagram illustrating attributes of the parts object information and manufacturing and field issues object information in FIG. 4. The parts object information 425 can have updated attributes that are relevant for establishing the relationship to the issue analysis objects information 340. The relationship of an issue analysis object 340 to parts object 425 can be 1 to N. Each issue analysis object 340 can represent the information gathered from manufacturing and field issues reported.

The issue analysis object 340 will have attributes typically representing the type of issue, e.g., a failure, and context of the issue. For example, such attributes can include an issue ID 550 that identifies a particular issue from the manufacturing and field issue analysis. Other attributes may be affected parts 555, affected products 560, an underlying root cause 565, e.g., "bad component", "degraded component", "bad connection" or "bad interface" and an issue's environment 570, such as voltage, humidity, dust and number of cycles, among other attributes 575. The parts selection rule modifier 330 can provide a relationship between the parts objects 425 and the issue analysis objects 340 in order to create new rules or modify existing rules for parts selection. The part objects can have several attributes including but not limited to, part ID 500, applicable products 505, pre-requisites 510, co-requisites 515, preferences 520 such as "application" and "customer", "Can Not Work With" 525, field environment 530 such as "number of cycles", "voltage", "dust" and "humidity", and application 535 among other attributes 540.

In further illustration, FIG. 6 is a table containing examples of rules used to modify order configuration rules. The first modifier rule states that if a specific part is failing only in one or two products, remove these products from the Applicable Products list 505 attribute of that part's object information 425. For example, a component part "3N5427" fails in 9 of 9 occurrences. The failures occur in two products, e.g., product "6335" and product "7509". There are no associated parts with the failing part "3N5427". This information can be dynamically feedback to the part selection rule modifier 330, which applies a set of "meta rules/logic" such as the first rule of the table in FIG. 6. In this example, the course of action is to update the Applicable Product list attribute 505 to remove products "6335" and "7509", and thereby insure that part "3N5427" is no longer selected for use in products "6335" and "7509".

The second modifier rule of the table in FIG. 6 states that if a part is failing in all products but only when used with certain other parts and/or products, modify the "Can Not Work With" list attribute of this apparently invalid combination of parts to include the certain part or parts that are causing the failure of the first part. In addition, any related pre-requisites or co-requisites attributes should be modified if the problem parts and/or products appear in the pre-requisites or co-requisites attribute lists. For example, a component part "5T3333" fails in 7 of 7 occurrences. The failures occur in one product, e.g., product "4436". Part "6R8756" is associated with the failing part "5T3333". This information can be dynamically feedback to the part selection rule modifier 330, which applies a set of "meta rules/logic" such as the second rule of the table in FIG. 6. In this example, the course of action is to update the Can Not Work With list attribute 525 to include part "6R8756", and thereby insure that part "6R8756" is no longer selected for use in combination with part "5T3333" in future configured orders.

Figure 7:
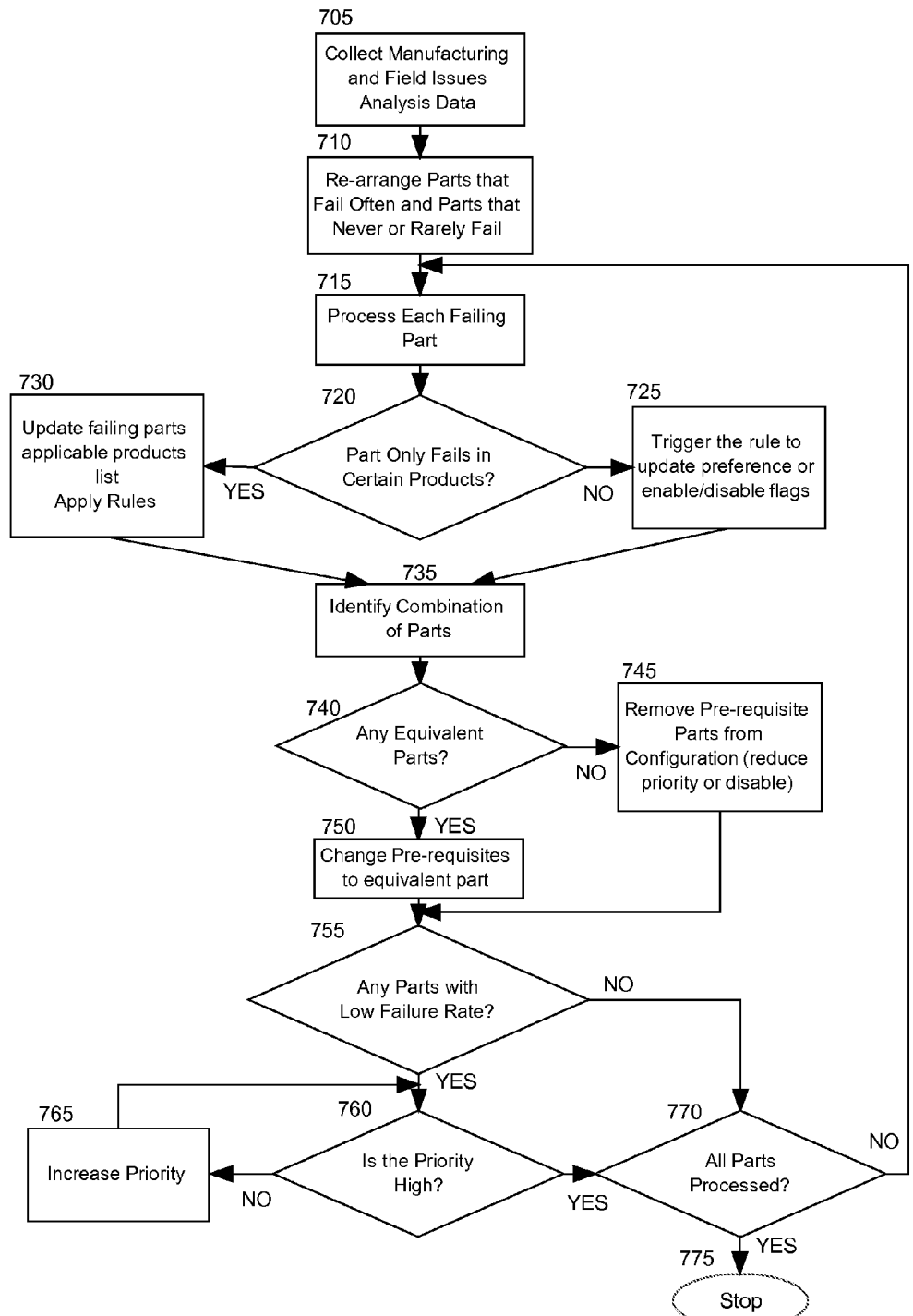
FIG. 7 is a flowchart illustrating a process for the parts selection rule modifier using the dynamic manufacturing and field issues feedback.

In still further illustration, FIG. 7 is a flowchart illustrating a process for the parts selection rule modifier 330 using the dynamic manufacturing and field issues feedback data. Beginning in block 705, manufacturing and field issues for manufactured products can be observed and collected for analysis 410, feedback to parts selection rule modifier 330 and/or manufacturing and field issues storage 140. In block 710, the parts that have the greatest number of manufacturing and field issues, e.g., those parts that fail most often, are separated from those parts that never or rarely have manufacturing and field issues. The parts identified as having the greatest number of manufacturing and field issues can be processed in block 715. The processing of these identified parts can include generating an issues analysis object information 340 for each corresponding manufacturing and field issue collected.

In decision block 720, it can be determined whether the identified component only fails in certain products. If so, the identified component's applicable products list is updated to remove the products in which the identified component has issues or fails. Otherwise, the preference attribute of the identified component can be modified to reduce its priority or even disable its use altogether, e.g., remove the part from the "available" list and/or place the part on an "exclusion" list of the optimized configurator 320 in block 725. In block 735, associated parts of the identified problem part can be determined. For example, the identified problem part is part number "5Y3421" and its pre-requisite (or co-requisite) part is "6J7869". In decision block 740, it can be determined if there are any equivalent parts to part number "5Y3421", and if so, in block 750, the equivalent part (e.g., part number "5Y3422") can be used to replace part number "5Y3421" in the pre-requisite (or co-requisite) attribute list of part number "6J7869". Otherwise, pre-requisite (or co-requisite) part number "6J7869" can be removed from the product configuration by reducing its priority or even disabling its use altogether, e.g., remove the part from the "available" list of the optimized configurator 320 in block 745.

In an effort to improve product reliability and availability, in block 755, the process can future include determining if there are any parts available that have a lower failure rate, which could be used instead of the equivalent parts identified in decision block 740. If so, in decision block 760, the priority attribute of the part having a lower failure rate is checked and if it is determined that its priority is not set to the highest level, then its priority is increased in block 765.

Finally, in decision block 770, it can be determined if additional parts remain to be processed. If so, the process can continue in block 715 as before. Otherwise, the process will stop in block 775.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for dynamically tuning order configurator performance, the method comprising:
    collecting product issue data for a manufactured product, the product issue data including performance and attribute information of a part of the manufactured product;
    analyzing in an optimized order configurator executing in memory by a processor of a computer the collected product issue data to identify a problematic part; and,
    modifying the order configurator using the analyzed product issue data, wherein the modifying the order configurator using the analyzed product issue data further comprises modifying an existing part selection rule by removing the problematic part from an availability list of the manufactured product.

2. The method of claim 1, further comprising deploying the manufactured product in a location selected from the group consisting of (i) a manufacturing facility and (ii) a field deployment.

3. The method of claim 1, wherein the modifying the order configurator using the analyzed product issue data comprises adding a new part selection rule.

4. The method of claim 1, wherein the modifying the order configurator using the analyzed product issue data comprises modifying an attribute of the problematic part to avoid repeating a current product configuration.

5. The method of claim 4, wherein the modifying an attribute of the problematic part comprises removing the manufactured product from an applicable products list of the problematic part.

6. A product issues data processing system comprising:
    a product issues data store;
    a product issues analysis module coupled to the product issues data store and executing in memory by at least one processor of a computer;
    an automated product issues feedback engine coupled to the product issues analysis module, the product issues feedback engine comprising program code enabled to collect product issues data for a manufactured product, the product issues data associating characteristics of the manufactured product determined to have issues during manufacturing and field deployment, to modify an existing configuration order for the manufactured product to account for the characteristics in the collected product issues data;
    wherein the product issues feedback engine further comprises:
    issues analysis object information;
    a parts selection rule modifier coupled to the issues analysis object information wherein the parts selection rule modifier comprises program code enabled to dynamically change priorities of parts, the applicability status of parts, and to selectively enable or disable parts; and
    an optimized order configurator coupled to the parts selection rule modifier, the order configurator comprising rules for parts selection and parts object information and the parts selection rule modifier comprising program code enabled to dynamically change priorities of parts, the applicability status of parts, and to selectively enable or disable parts.

7. The system of claim 6, wherein the program code is further enabled to apply the modified configuration order to the manufactured product.

8. The system of claim 6, wherein the product issues analysis object information comprises a collection of root cause analysis information.

9. A computer program product comprising a computer usable storage medium embodying computer usable program code for generating product issue feedback, the computer program product comprising:

computer usable program code for collecting product issue data for a manufactured product, the product issue data including performance and attribute information of a part of the manufactured product;

computer usable program code for analyzing the collected product issue data to identify a problematic part; and computer usable program code for modifying the order configurator using the analyzed product issue data, wherein the computer usable program code for modifying the order configurator using the analyzed product issue data comprises modifying an existing part selection rule by removing the problematic part from an availability list of the manufactured product.

10. The computer program product of claim 9, wherein the computer usable program code for modifying the order configurator using the analyzed product issue data comprises adding a new part selection rule.

11. The computer program product of claim 9, wherein the computer usable program code for modifying the order configurator using the analyzed product issue data comprises modifying an attribute of the problematic part to avoid repeating a current product configuration.

12. The computer program product of claim 11, wherein the computer usable program code for modifying an attribute of the problematic part to avoid repeating a current product configuration comprises removing the manufactured product from an applicable products list of the problematic part.

* * * * *